March 17, 1959     J. C. HOBBS     2,878,040
SAFE-WELD PIPE JOINT

Filed Nov. 16, 1954     3 Sheets-Sheet 1

*INVENTOR.*
JAMES C. HOBBS

BY
RICHEY, WATTS, EDGERTON & McNENNY

*ATTORNEYS*

March 17, 1959 — J. C. HOBBS — 2,878,040
SAFE-WELD PIPE JOINT
Filed Nov. 16, 1954 — 3 Sheets-Sheet 2

INVENTOR.
JAMES C. HOBBS
BY RICHEY, WATTS, EDGERTON & McNENNY
ATTORNEYS

INVENTOR.
JAMES C. HOBBS
BY
RICHEY, WATTS, EDGERTON & McNENNY
ATTORNEYS

United States Patent Office 2,878,040
Patented Mar. 17, 1959

2,878,040

SAFE-WELD PIPE JOINT

James C. Hobbs, Coral Gables, Fla.

Application November 16, 1954, Serial No. 469,217

5 Claims. (Cl. 285—286)

This invention relates generally to the art of welded pipe joints and particularly to a new welded joint between pipes or conduits having different thermal expansion characteristics.

Welded joints connecting the ends of metal pipes are subjected to forces created by temperature changes. These forces vary with the coefficients of expansion of the pipes connected by the weld metal, with the differences in those coefficients, with the range of temperatures through which the pipes are heated and more particularly with the difference between the temperatures existing at any instant in the related parts of the pipe joint. The strength, durability and reliability of the joints depends on the number of heating and cooling cycles to which the joint is subjected and the extent to which the pipes are stretched, i. e., whether the stretching in either pipe, or in both pipes is beyond the elastic limit.

As operating temperatures have increased, the danger of breakage of the joints has increased, so that many welded joints now in use are actually great hazards to life and property because of the uncertainty as to how many times those joints may be heated and cooled before they break and the certainty that they will eventually break when they are stretched beyond the elastic limit an excessive number of times. That this danger is appreciated is indicated by the fact that heating elements have been applied to some of such joints in high pressure high temperature steam lines in power plants to keep them at about full temperature even when the piping is not in use. Many pipe joints have ultimately failed during the cooling part of the cycle although damage during the heating part of the cycle contributes to the failure. The object of the invention is to secure a safe, practical joint for connecting two bodies which have passage therethrough and whose boundaries have different expansion characteristics due to different coefficients of expansion, or different heating performance such as the connecting of a thick pipe or valve with a thin member. Obviously the thin one will heat and cool more rapidly than the thick one. The use of this invention will permit different rates and amounts of expansion of such pipes without danger of rupture or even leakage because one end of the annulus which is employed may be at a temperature or have an expansion different from the opposite end because the diameter of the annulus can vary with the temperature at the different planes transverse to the pipe axis without causing stress or strain. This condition avoids the destructive condition when free expansion or contraction is not permitted such as exists in a thick pipe and more particularly a pipe with an integral flange.

The present invention recognizes the existence of the extremely high forces just mentioned as well as the dangers and results of breakage of the joints. The invention does not attempt the impossibility of preventing expansions, but it does greatly minimize their effects with resultant reduction of likelihood of breakage and the danger attending breakage and it does control the location of any such breakage, should it occur, so that it can do no harm. Thus this invention provides, for the first time in the art, so far as I know, a welded metal joint between two pipes which is substantially unbreakable due to thermal expansion forces and which will prevent damage if and when any breakage in the joint should occur.

This invention is based on the concept of imposing little or no resistance to much of the force of expansion, and using part of that force to exert pressure on completely confined weld metal, thus absorbing some of such force in compression of that weld metal and using another part of that force to exert pressure on partly confined weld metal.

This invention may be embodied in many different forms of devices. In general it may be said that apparatus embodying the invention comprises two pipes having telescoped end portions, an annulus between the telescoped portions and axially spaced, annular welds connecting the annulus to the pipes.

This invention recognizes that the critical part of a joint is in a zone defied by two transverse planes, one at the place of contact of the inner end of the inner pipe with the outer pipe and the other at the apex of the outer ring of weld metal; and that the forces to be resisted are those created by axial expansion of the metal between those two planes and the differential radial expansion of the several metal walls in that zone. The present invention provides structure for resisting those forces by making that zone axially short, by making the annulus thinner than the pipe ends on either side of it, and by making the length of the annulus between the rings of weld metal between about one and about four times the thickness of the inner pipe.

Preferably the weld metal joining the annulus and the inner pipe is completely confined by the pipe ends and annulus and is subjected to compression forces caused by the different expansion characteristics of the metal of the pipes. Thus the probability of breakages of this weld metal is greatly minimized and the danger resulting from any such breakage is correspondingly reduced.

The problem of connecting metal pipes of different thermal expansion characteristics is complicated by the variations in critical conditions.

Ordinary piping receives its source of maximum heat through its interior surfaces, the outside surfaces usually being insulated to reduce the loss of heat. The interior surfaces also transmit heat from the pipe to the contents of the pipe when such contents are cooler than the metal of the pipe. This condition may be more dangerous and cause more damage than the heat flow from the contents to the pipe. When the contents are very much colder than the pipe, the outer surfaces of the pipe do not contract substantially, but the inner surface does contract beyond the elastic limit with resultant condition commonly known as "alligaor cracking." Numerous repetitions of the heating and cooling cycle of such a pipe may cause the cracks to progress until leakage results and in some cases complete fracture of the pipe occurs.

Another condition is found in superheater tubes wherein the principal heat flow is from the outside surface into the tubular member but with the possibility of severe quenching occurring when, as in superheater operation, a "slug" of water accidentally enters the superheater. Because the heat is greatest on the outside of the tube, the temperature of the outside metal surface is greater than the inside and the difference will vary inversely in proportion to the thickness of the tube wall. It is, therefore, evident that the thinnest walls which will carry the pressure are most desirable because the temperature differences between the outside and inside surface are less and the stresses are correspondingly less.

Because temperature stresses are often so much greater than pressure stresses in such piping and tubing, every effort should be made to reduce the temperature stresses. A 150° F. change in the temperature of ordinary steel will cause a change in dimension of 0.1% which is the same change as occurs when the same material is subjected to a 30,000 p. s. i. stress, approximately the elastic limit at which permanent deformation occurs at 70° F. Steel piping and tubes in modern plants are frequently subjected to temperatures of over 1000° F. and to sudden differences in temperature of more than 500° F. This difference is equivalent to a change in dimension of over 0.33% and a stress of 100,000 p. s. i. Thus it is little wonder that high damaging stresses may and do occur during heating or cooling. Slow changes allow metal structures having the same coefficient of expansion to expand and contract without exceeding the elastic limit but where two metals having different coefficients of expansion are concerned, the elastic limit will be exceeded by one or both when the temperature reaches the critical value.

The present invention will be better understood by those skilled in the art by reference to the drawings which accompany and form a part of this specification and in which.

Figure 1:
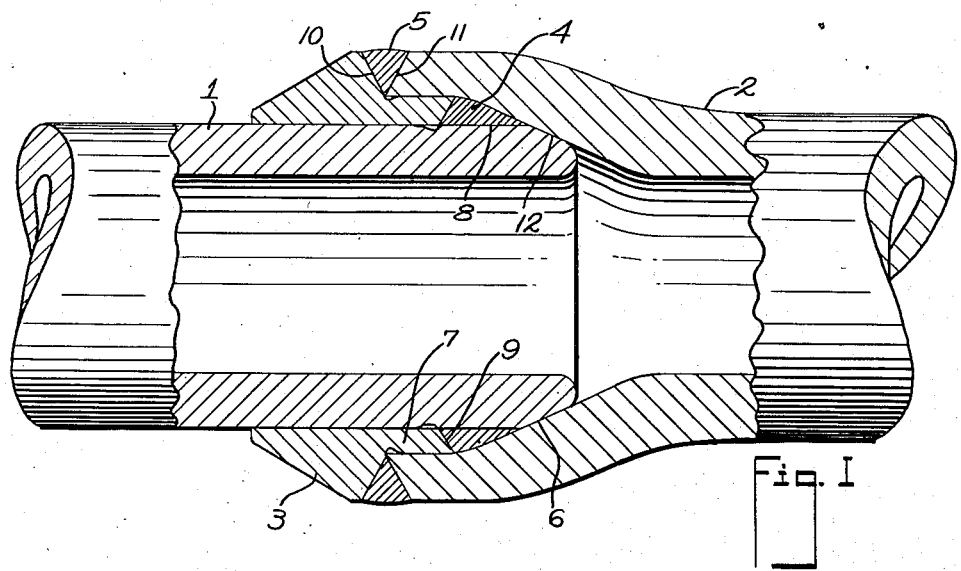
Fig. 1 is a side elevational view, partly in section, of a pipe joint embodying the present invention.

The pipe joint illustrated in Fig. 1 comprises a first or inner pipe 1, a second or outer pipe 2, an annulus 3, a first ring of weld metal 4 connecting the inner pipe to the annulus and a second ring of weld metal 5 connecting the annulus to the outer pipe. It will be noted that one end of inner pipe 1 extends into the adjacent end of pipe 2 and bears against the inner surface of the second pipe as is indicated at 6. The end of pipe 2 is flared outwardly to receive the end of pipe 1 and is of sufficient internal diameter to prfovide a space outside of pipe 1 into which the nose portion 7 of annulus 3 may extend and also in which the ring of weld metal 4 may be positioned. The annulus is thinner than the pipe ends on either side thereof and its length between weld metal 4 and 5 is slightly greater than the thickness of pipe 1. The annulus supports the outer axial side of weld 5.

In constructing the joint of Fig. 1, the annulus 3 is located on the end of pipe 1 substantially as shown and is connected thereto by the ring of weld metal 4 which is joined to the outer surface 8 of pipe 1 and to the end surface 9 of the nose portion 7 of annulus 3. Then pipe 1 is brought into the flared end of pipe 2 substantially as shown in Fig. 1 and the ring of weld metal 5 is made and connects end surface 10 of the annulus with the opposed end surface 11 of the outer pipe 2.

In the joint of Fig. 1 the first or inner pipe 1 has a coefficient of expansion which is higher than the coefficient of expansion of the outer pipe 2, the annulus 3 and both rings of weld metal 4 and 5. Preferably the coefficients of expansion of these five elements should cascade in descending value beginning with the inner pipe, i. e., the coefficient of expansion of pipe 1 should be greater than that of weld metal 4 which, in turn, should have a greater coefficient of expansion than that of annulus 3 and weld metal 5 should have a lower coefficient of expansion than annulus 3 and a higher coefficient of expansion than that of outer pipe 2. However, it is to be understood that this cascading arrangement of coefficients of expansion is not absolutely necessary but that it is important that the inner pipe 1 should have a higher coefficient of expansion than the outer pipe 2 and that the annulus should have a coefficient of expansion between the coefficients of these two pipes.

The pipe joint of Fig. 1 operates substantially as follows: When the pipes 1 and 2 are heated either internally or externally they expand axially and radially. The radial expansion is non-uniform for during the heating cycle the temperature varies from highest in the inner portion of the inner pipe to lowest in the outer portion of the outer pipe. As the inner pipe is heated and expands radially it applies compressive forces to the annulus when the annulus is in contact with both pipes; and, as the inner pipe expands from its inner end which is seated on the outer pipe, it applies compressive forces to the inner ring of weld metal and to the part of the annulus between the two rings of weld metal. Since the annulus is so thin and short, and is so confined and subjected to these axial and radial forces, it is compressed and deformed sufficiently to accommodate the differential expansion of the pipe ends without breakage of the joint. This deformation may exceed the elastic limit of pipe 1, in which case the two pipes will not be in contact at 6 when they are again cooled to room temperature or at the temperature at which they were initially assembled. For practical purposes, especially in considering coefficients of expansion, the temperature of 70° F. has been taken as the temperature at which the pipes are assembled preparatory to making a joint. During the heating cycle and the axial expansion of the pipes 1 and 2, a portion of annulus 3 moves axially relative to pipe 1. Similarly, during such heating cycle pipe 2 moves axially relative to a portion of annulus 3 and weld metal 4. During the movements of the several parts due to expansion of the pipes, the ring of weld metal 4 and the inner end of annulus 3 will be subjected to compression by reason of being confined between pipes 1 and 2 and annulus 3. Furthermore, radial expansion of the joint applies compressive force to the ring of weld metal 4 by reason of the greater outward expansion of pipe 1 than of pipe 2.

Thus, it is seen that the pipes are permitted to expand axially and radially without much resistance being offered thereto by the joint and that some of the forces due to axial and radial expansion are employed to exert pressure on completely confined weld metal. Since the ends of pipes 1 and 2 are in telescoped position, the expansions of these two pipes offset one another except as to the expansion of one in excess of the other and this excess is effecitve in the joint to deform the inner end of pipe 1 to apply compressive force to weld metal 4. During the cooling cycle the operation of the parts or elements of the joint of Fig. 1 is substantially the reverse of what has just been described as taking place on the heating cycle. The inner weld 4 is an important part of the joint for it connects two pipes which have different coefficients of thermal expansion and it must take the brunt of the resultant stresses as well as prevent the escape of fluid at high temperatures and high pressures from the pipes. Moreover, this weld canot fail either in tension or compression. Since it is never subjected to tension force it cannot fail in tension. Since it is always confined it cannot fail in compression. When conventional joints fail, they invariably fail in tension. This inner weld may be made in the shop where the welding procedure may be carefully controlled.

Weld ring 5 is thicker and stronger than weld ring 4 and usually connects the same metals or metals having substantially the same coefficient of thermal expansion and is usually subject to slower temperature changes and smaller differentials. The annulus acts as a back up ring for this weld, reinforces it and prevents entry of molten weld metal into the pipes.

In this manner a joint constructed as shown in Fig. 1 described above permits the pipes to expand and contract without affording great resistance thereto and converts some of those forces into forces of compression or tension in the annulus and in a ring of confined weld metal.

It is to be understood that the present invention is of general use with various metals. One important commercial use of the invention is in the joining of austenitic steel pipes to mild or low carbon steel pipes for use in handling fluids at high temperatures. In such a use the pipe 1 of Fig. 1 would be composed of austenitic steel and the pipe 2 would be composed of mild steel with the annulus 3 being composed of a steel preferably having a composition between those of the two pipes. Weld metal 4 would preferably have a composition somewhere between that of the pipe 1 and annulus 3 while weld metal 5 would preferably have a composition between that of the annulus and the outer pipe 2.

Figure 2:
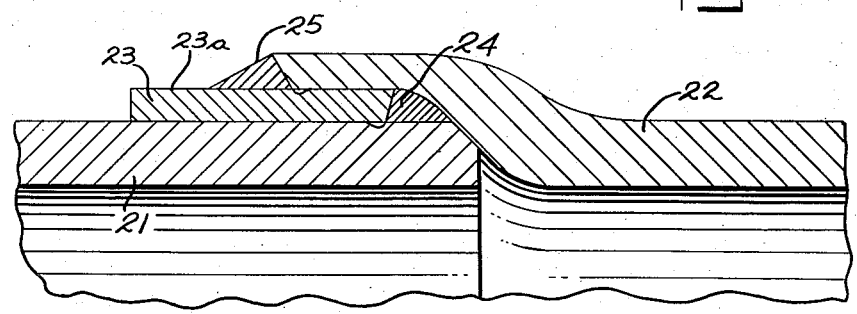
Fig. 2 is a fragmentary, longitudinal, sectional view of a modified form of pipe joint embodying the present invention.

In the modification of the present invention shown in Fig. 2, the first or inner pipe 21 and the second or outer pipe 22 are quite like pipes 1 and 2 of Fig. 1. However, the annulus 23 is unlike annulus 3 in that it has a substantially cylindrical outer surface 23a. The ring of weld metal 24 is quite like ring 4 of Fig. 1 but the ring of weld metal 25 differs from ring 5 of Fig. 1 in that it is connected to the outer cylindrical surface 23a of annulus 23. The end portion of pipe 22 which extends over the annulus 23 is thinner than the wall of pipe 21 and thinner than the part of pipe 22 remote from the joint. In these respects the pipes resemble the pipes of Fig. 1. The thin portion of each of these pipes affords decreased resistance to radial expansion of the members of the joint therewithin than would be the case if the telescoping part of pipe 2 were of the same thickness as the other parts thereof. The annulus 23 is thinner than pipe 21 and has a length between welds 24 and 25 which is nearly twice the thickness of pipe 21. Weld 25 is reinforced by its elongated connection to annulus 23.

The manner of making the joint of Fig. 2 and its mode of operation and results are substantially as have been described above in connection with the joint of Fig. 1.

Figure 3:
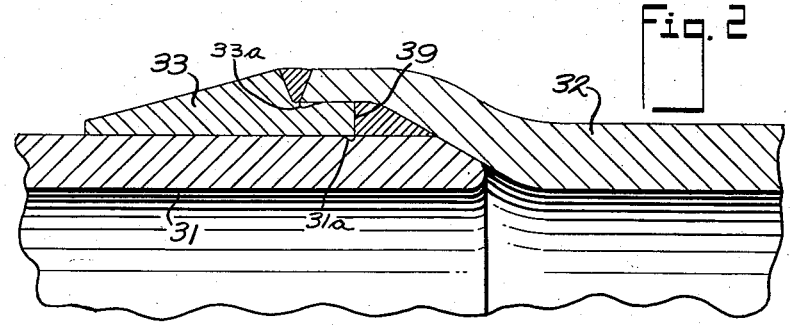
Figs. 3, 4, 5, 6, 7, 8, and 9 are views similar to Fig. 2 but showing, respectively, different modifications of the present invention.

In the modification of the present invention shown in Fig. 3 the inner pipe 31, outer pipe 32 and annulus 33 are quite like pipes 1 and 2 and annulus 3 of Fig. 1. The annulus 33 is thinner than pipe 31, has a length between the two rings of weld metal which is about equal to the thickness of pipe 31 and reinforces the outer ring of weld metal. The inner end surface 39 of annulus 33 is approximately at right angles to the outer surface of pipe 31 while in Fig. 1 the corresponding end surface 9 is inclined at an acute included angle to the outer surface of pipe 1. The manner of constructing the joint of Fig. 3 and mode of operation and results are substantially the same as have been described above in connection with Figs. 1 and 2. Annular grooves 31a and 33a are so located as to provide a smooth junction between the members connected and thus avoid sharp corners or changes in section that would undesirably increase the stresses in that area of the structure.

Figure 4:
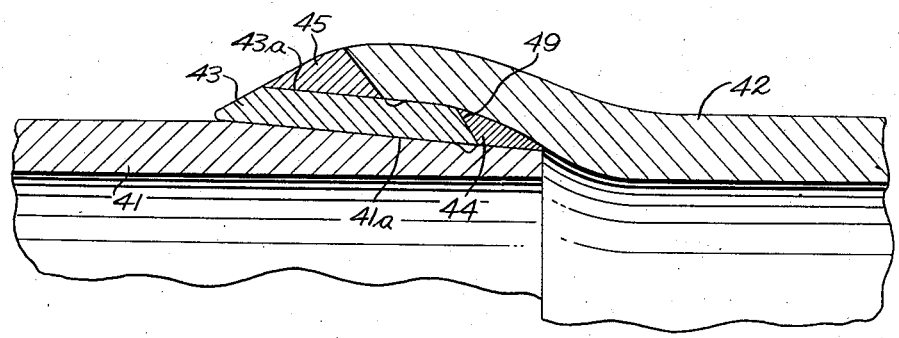

In the embodiment of the present invention illustrated in Fig. 4, pipes 41 and 42 correspond to pipes 1 and 2 of Fig. 1. The end of pipe 41 which constitutes a part of the joint is provided with a recess on its outer surface defined by two intersecting frusto-conical surfaces 41a and 42a. The annulus 43 is frusto-conical and has an inner surface seating on surface 41a and an inner end surface 49 which is opposed to the other frusto-conical surface 42a of pipe 41 to form with the inner surface of pipe 42 a recess for a ring of weld metal 44. A ring of weld metal 45 is connected to the end surface of pipe 42 and the outer surface 43a of the annulus 43. In this case the part of pipe 41 which constitutes part of the joint is thinner than the parts of the wall remote from the joint, is thinner than the annulus and is also thinner than the surrounding part of the pipe 42. Annulus 43 reinforces weld metal 45 by its axially long connection thereto and has a length between the two welds which is nearly three times the thickness of the inner pipe.

The manner of constructing the joint of Fig. 4 and its mode of operation and results are substantially as has been described above in connection with Fig. 1.

Figure 5:
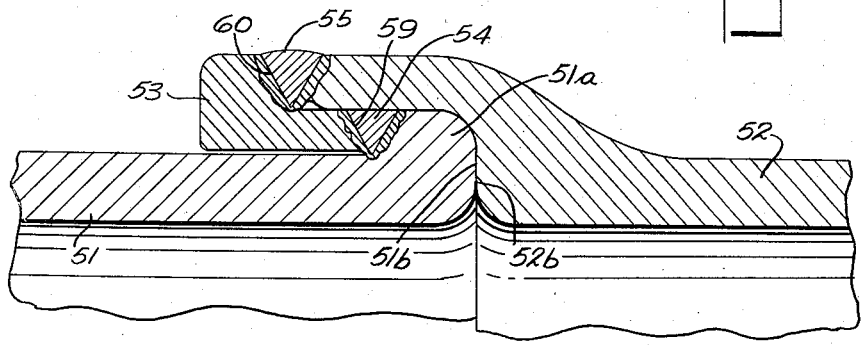

In the modification of the present invention shown in Fig. 5 the joint comprises inner pipe 51, outer pipe 52, annulus 53 and inner and outer rings of weld metal 54 and 55. In this modification the inner end of pipe 51 has been enlarged radially or upset as is indicated at 51a and has an end surface 51b approximately normal to the longitudinal centerline of the pipe which surface abuts against a correspondingly disposed surface 52b on pipe 52. The ring of weld metal 54 connects the inner end surface 59 of annulus 53 to the opposed surface of portion 51a of pipe 51. Similarly the end surface 60 of the annulus is connected by weld metal 55 to the opposed end surface of pipe 52. Lines 54a and 55a indicate approximately the extent of penetration of the welds into the members connected.

The annulus 53 reinforces weld ring 55, is thinner than pipe 51 and has a length between the rings of weld metal which is approximately equal to the thickness of the inner pipe.

The manner of making the joint of Fig. 5 and its mode of operation and results are substantially the same as have been described above in connection with Fig. 1.

Figure 6:
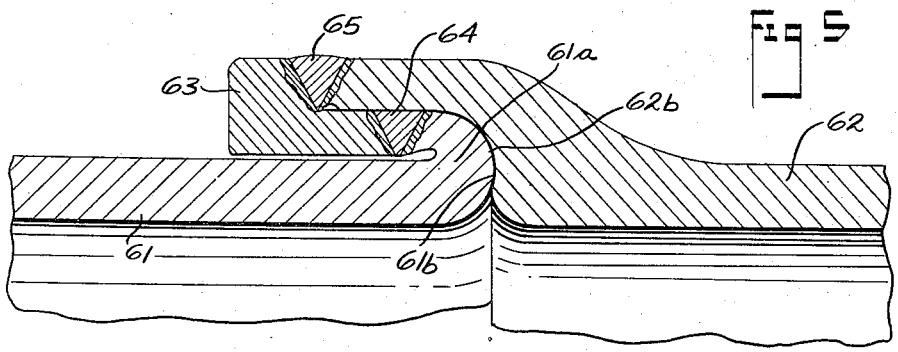

In Fig. 6 the joint comprises the ends of pipes 61 and 62, annulus 63 and rings of weld metal 64 and 65 corresponding generally to parts 1 to 5, inclusive, of Fig. 1. In this modification the inner end of pipe 61 is enlarged radially by being spun back on itself as at 61a corresponding in general to the upset portion 51a of Fig. 5. The curved end surface 61b of pipe 61 bears against a correspondingly curved surface 62b of pipe 62.

The annulus 63 reinforces weld metal 65, has a length between welds 64 and 65 which is approximately equal to the thickness of pipe 61 and the portion between those welds is thinner than pipe 61.

The manner of constructing the joint of Fig. 6 and its mode of operation and results are substantially the same as have been set out above in connection with Fig. 1.

Figure 7:
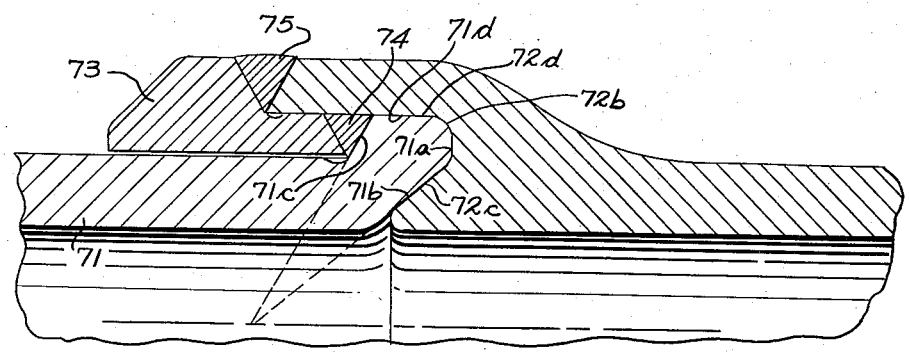

The modification of the present invention shown in Fig. 7 comprises the ends of pipes 71, 72, annulus 73 and rings of weld metal 74 and 75 all corresponding generally to the modification shown in Fig. 1. In this modification, however, the inner end of pipe 72 has an enlarged portion 71a which may be formed by upsetting if desired and this portion 71a is received in a recess 72b. The inner end surface 71b and the outer surface 71c which is to be connected to weld metal 74 are frusto-conical and have their apices at substantially the same point on the center line of pipe 71. In other words, each of surfaces 71b and 71c is generatable by the rotation of a straight line about one end thereof fixed in position on the centerline of pipe 71. The surface 72c of pipe 72 is also frusto-conical with its apex at substantially the same point as the apex of surface 71b.

The manner of constructing the joint of Fig. 7 and its mode of operation and results are substantially as have been described above in connection with Fig. 1. Additionally, the arrangement of surfaces 71b, 71c and 72c afford the added advantage that an initial sealing contact may be made between surfaces 71b and 72c and that this contact will be maintained throughout the expansion and contraction of the pipes; and that in addition to the sealing contacts of these two surfaces a sealing contact may also be made during part at least of the heating cycle between the outer cylindrical surface 71d of the inner pipe and the inner cylindrical surface 72d of the pipe 72.

Figure 8:
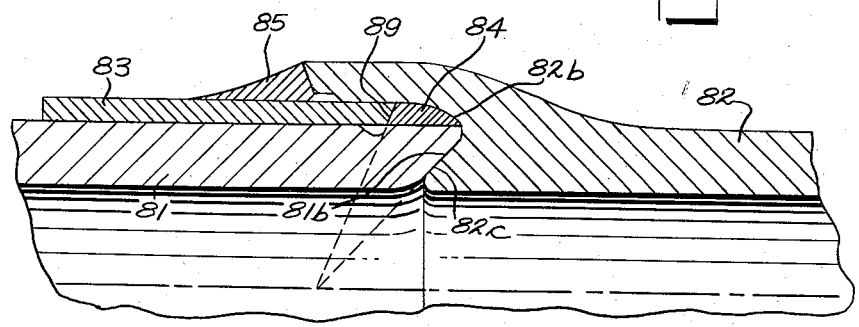

In the modification of the present invention shown in Fig. 8 the joint combines some of the structural features and advantages of the joints of Figs. 1 and 7. In Fig. 8 the joint comprises inner pipe 81, outer pipe 82, annulus 83 and rings of weld metal 84 and 85. In this case the inner end of pipe 81 is provided with a frusto-conical surface 81b which has an apex on the centerline of pipe 81 at substantially the same point where the apex of the frusto-conical inner surface 89 of annulus 83 is located. Pipe 82 is provided with a recess 82b to receive the inner end of pipe 81 and weld metal 84 and has a frusto-conical surface 82c, the apex of which is located at substantially the same point as the apex of surface 81b. By reason of this arrangement of surfaces 81b and 82, sealing contact may be made between these surfaces and maintained throughout the cooling and heating cycles of the joint. The annulus 83 has a substantially cylindrical outer surface which is connected by weld metal 85 to the end surface of pipe 82 after the manner shown in Fig. 2. It will be noted that the telescoping end of pipe 82 is thinner than other parts of the pipe and also thinner than pipe 81 as is also true of the modification shown in Figs. 5, 6 and 7. the rotation of a straight line about one end thereof fixed The manner of constructing the joint of Fig. 8 and the mode of operation and results are substantially the same as have been described above in connection with Figs. 1 and 7.

Figure 9:
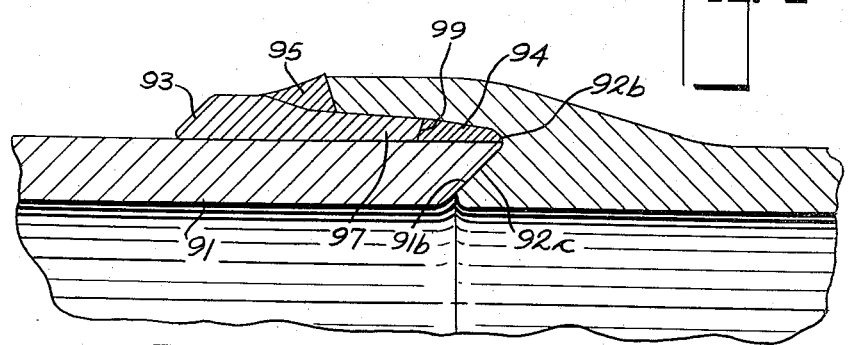

The modification of the present invention shown in Fig. 9 comprises inner pipe 91, outer pipe 92, annulus 93 and rings of weld metal 94 and 95, all corresponding generally to parts of Figs. 1, 7 and 8. In this modification the inner end of pipe 91 is provided with a frusto-conical surface 91b which has an apex on the centerline of pipe 91. Pipe 92 has a recess 92b to receive the inner end of pipe 91 and weld metal 94 and has a frusto-conical surface 92c, the apex of which is located on the longitudinal centerline of pipe 91 at substantially the same point as the apex of surface 91b. Also, as in the modification of Fig. 8, the inner end surface 99 of annulus 93 is frusto-conical with its apex at approximately the same point as the apex of surfaces 91b and 92c. The nose portion 97 of annulus 93 is tapered or frusto-conical to fit against the correspondingly shaped inner surface of pipe 92. The telescoping portion of pipe 92 is thinner than the other parts thereof and thinner than the wall of pipe 91

In the modification shown in Figs. 7, 8 and 9 the annulus in each instance is thinner than the inner pipe, reinforces the outer ring of weld metal and has a length between the rings of weld metal which is a little greater than the thickness of the inner pipe.

The manner of constructing the joint of Fig. 9 and its mode of operation and results are substantially the same as have been set out above in connection with Figs. 1, 7 and 8.

Having thus described the present invention so that others skilled in the art may be able to understand and practice the same, I state that what I desire to secure by Letters Patent is defined in what is claimed.

What is claimed is:

1. A safe weld joint for connecting two metal pipes, comprising an end portion on the first pipe extending into an end portion on the second pipe, the thermal expansion characteristics of the first pipe being greater than those of the second pipe, a metallic annulus disposed around said end portion of the first pipe and extending into the end portion of the second pipe, the thermal expansion characteristics of the annulus being not more than those of the first pipe and not less than those of the second pipe, a first ring of weld metal connecting the inner end of the annulus to the first pipe and a second ring of weld metal connecting the end surface of the second pipe to the annulus, the annulus extending beyond the end portion of the second pipe a distance greater than the thickness of the end portion of said second pipe, said rings of weld metal partly defining therebetween an axially short zone on said annulus extending longitudinally of the joint, the cross sectional area of the wall of the annulus lying in said zone being smaller than that of the said end portions in said zone, whereby upon thermal changes occurring in said pipes, any failure in said joint will occur in said annular zone.

2. The combination of elements set forth in claim 1 in which the metal of the first said pipe is austenitic steel and the metal of the said second pipe is ferritic steel.

3. The combination of elements set forth in claim 1 in which the metal of the first and second pipes is austenitic steel and ferritic steel respectively and the metal of the annulus is ferritic steel.

4. The combination of elements set forth in claim 1 in which the thermal expansion characteristics of the weld metal are not more than that of the first pipe and not less than that of the second pipe.

5. The combination of elements set forth in claim 1 in which the metal of the first pipe is austenitic steel and the metal of the second pipe and the metal of the annulus is ferritic steel and the thermal expansion characteristics of the weld metal are not more than those of the first pipe and not less than that of the second pipe.

References Cited in the file of this patent

UNITED STATES PATENTS

| 1,960,557 | Snyder | May 29, 1934 |
| 1,992,612 | Hall | Feb. 26, 1935 |
| 2,183,043 | Kerr | Dec. 12, 1939 |
| 2,368,391 | Young | Jan. 30, 1945 |
| 2,575,213 | Fruth | Nov. 13, 1951 |
| 2,611,238 | Fryer | Sept. 23, 1952 |
| 2,649,315 | Ipsen | Aug. 18, 1953 |
| 2,695,184 | Hobbs | Nov. 23, 1954 |

FOREIGN PATENTS

| 576,841 | Germany | May 17, 1933 |